N. B. HENRY.
CAGE FOR OIL PRESSES.
APPLICATION FILED MAY 25, 1920.

1,357,052. Patented Oct. 26, 1920.

Inventor:
Nelson B. Henry
By Mitchell, Chadwick & Kent,
Attys.

UNITED STATES PATENT OFFICE.

NELSON B. HENRY, OF ATLANTA, GEORGIA, ASSIGNOR TO THE MURRAY COMPANY, OF DALLAS, TEXAS, A CORPORATION OF TEXAS.

CAGE FOR OIL-PRESSES.

1,357,052.  Specification of Letters Patent.  Patented Oct. 26, 1920.

Application filed May 25, 1920. Serial No. 384,225.

*To all whom it may concern:*

Be it known that I, NELSON B. HENRY, a citizen of the United States, residing at Atlanta, in the county of Fulton and State of Georgia, have invented certain new and useful Improvements in Cages for Oil-Presses, of which the following is a specification.

My invention is an improvement in cages for oil presses.

The present invention contemplates a construction of cage wherein a sleeve or tube preferably of steel and preferably of circular outline, is filled with one or more metallic rings having external peripheries tightly fitting the interior of the tube or sleeve and having an internal chamber to receive the cooked meats from which the oil is to be expressed.

The ring or rings are provided with means for receiving, and conducting away, the oil as it is expressed from the cake. The means provided are substantially as follows:

On all sides near the internal perimeter of each of the rings, a series of openings are drilled extending through the ring from face to face, to constitute oil ducts for leading the oil through the ring or rings. The interior of the ring is slotted along the internal perimeter, opposite each such opening and lengthwise thereof, to constitute passages from the interior of the ring to the ducts or openings through the ring.

In the preferred construction, after the ducts and slots are formed, each duct is broached to diminish the length of its slotted connection with the interior of the ring. The edges of the slots are also rolled down or swaged or distorted along the interior perimeter of the ring so as to close down or narrow the slot at its opening into the central space of the ring and to thereby diminish the opening to minute dimensions.

The openings or ducts in the ring are relatively large—sufficiently so to prevent clogging of the holes when the oil is passing through the same. The slots conducting oil from the cake to the ducts have a minute opening expanding as each passes to a duct, thus permitting the oil from the cakes to enter the slots in thin films but excluding the thicker solid materials of the cakes.

While it is possible to form a cage with but one ring of sufficient depth to receive a plurality of cakes, it is preferable in practice to build up the cage of a plurality of rings inserted into a tube or sleeve and with their ducts in alinement.

The continuous ducts thus formed by alined openings of superposed rings may be readily cleaned should matter accumulate therein. The formation of the conducting slots or channels opening into said ducts permits of oil in film form passing from the interior of the ring through said slots to the ducts. The slots are minute both in width and in length and they expand in width as they empty into said ducts. This prevents clogging of the slots.

The nature and scope of my invention will be more fully understood from the following description taken in connection with the accompanying drawings forming part hereof, in which—

Figure 1:
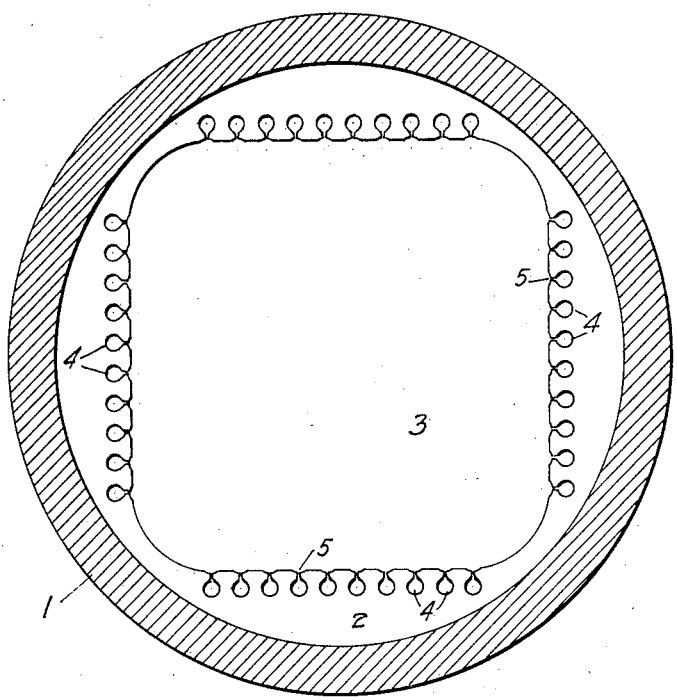
Figure 1 is a horizontal sectional view illustrating a cage embodying my invention.

Referring to the drawings, 1 represents the tube or sleeve of the cage and 2 a ring whose external periphery fits tightly the interior of said tube or sleeve 1. The interior space 3 of the ring 2 is shaped to receive the cake to be pressed—in the drawings the interior is nearly square to receive similarly shaped cakes. Around all interior edges of the ring and at or near said perimeter, the ring 2 is provided with a series of openings, 4, through the ring. Each opening or duct communicates with the interior space 3, of the ring by means of a slot or channel way 5 cut through the interior perimeter of the ring 2 lengthwise of the duct.

Figures 2, 3, 4:
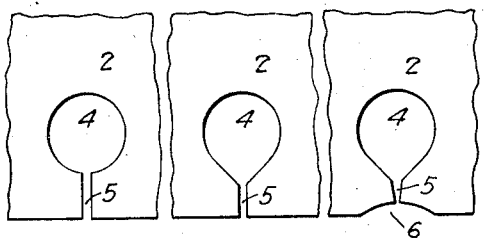
Figs. 2, 3 and 4 are detail views on an enlarged scale, illustrating the successive steps in forming the openings or ducts and the slots in the ring.
Figure 5:
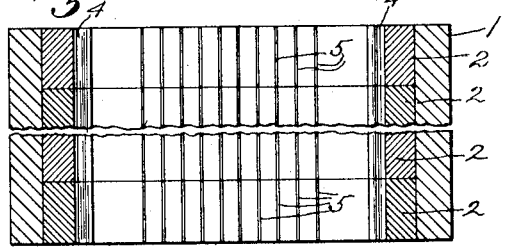
Fig. 5, is a vertical section of a cage embodying my invention, on a reduced scale.

In the ordinary formation of these slots 5 by machine operations, the slots are both too long and too wide. It becomes necessary therefore to shorten the slots and to bring their walls so close together at the entrance that a minute passageway will be formed to permit oil only to flow from the interior of the ring and cage to the ducts 4. The preferred manner of accomplishing this result is as follows:

After the ducts 4 are formed and the slots 5 cut through the ring (see Fig. 2), the ducts 4 are broached to substantially pear shape (see Fig. 3). This operation enlarges the duct substantially and shortens the length of the slot 5, but without bringing the walls of the slot together. The edges of the slot 5 are then rolled or swaged down as at 6 (see Fig. 4) and a narrow opening is thereby formed, the slots being so closed and shortened that only oil can pass from the interior of the cage through the short passageway which expands into a vertical duct 4.

The cage is formed by forcing a multiplicity of rings or frames, 2, after the formation of the ducts and slots, therein, into a sleeve 1 into which they tightly fit, with the ducts in each ring registering with the ducts in adjacent rings. When the sleeve is filled, the result is a unitary cage, made up of multiple rings held in true position by the frictional engagement of the peripheries of the rings with the inner surface of the sleeve 1.

Having thus described the nature and object of my said invention, what I claim as new is:—

1. In a cage for oil presses, a multiplicity of rings, each formed to receive a cake of material to be pressed, each ring having a series of ducts therethrough from face to face and a series of corresponding slots lengthwise of the duct extending from the interior perimeter of the ring to the duct; means to hold the assembled rings in true relation and to form a cage.

2. In a cage for oil presses, a sleeve; one or more rings each having an external periphery closely fitting the interior of the sleeve and each having an interior space to receive a cake to be pressed, each ring having a series of ducts extending through the ring from face to face and a series of slots, each extending from a duct through the internal perimeter of a ring.

3. In a cage for oil presses, a sleeve, one or more rings, each having an external periphery closely fitting the interior of the sleeve and each having an interior space to receive a cake to be pressed, each ring having a series of ducts extending therethrough from face to face and a series of slots, each extending from a duct through the internal perimeter of the ring, said ducts being broached to diminish the length of the slots, and the interior of the ring being rolled down along the inner edges of the slots to narrow the slots to minute dimensions.

4. In a cage for oil presses, the combination of a multiplicity of rings, each formed to receive a cake of material to be pressed, each ring having a series of ducts therethrough from face to face, each duct registering with a duct in the ring adjacent and having also a series of corresponding slots parallel with the ducts, each extending from the interior perimeter of the ring to the corresponding duct, said slots being of minute width at the interior perimeter of the ring; a sleeve in which the rings are assembled to hold the rings in true relation and to form a cage.

5. A ring for the purpose described having its interior shaped to fit a formed oil cake and having a series of ducts adjacent to the interior wall of the ring and extending from face to face of the ring and a series of slots formed in the interior wall of the ring and each connecting a duct with the interior of the ring, the internal edges of each slot forming a minute opening from the interior of the ring into the ducts.

6. A ring for the purpose described, having its interior shaped to fit an oil cake and having a series of ducts adjacent to the internal perimeter of the ring and a series of slots formed in the interior wall of the ring and each connecting a duct with the interior of the ring, each of said ducts being shaped to diminish the length of said slots and the edges or sides of each slot forming a minute opening from the interior of the ring into said ducts.

7. The method of forming rings for cages for presses, which consists in shaping it to fit respectively the ring-supporting means and the cake to be pressed, then forming a plurality of openings or ducts in the ring from face to face of the ring and adjacent to the internal perimeter of said ring, next forming slots in the wall of the interior space of the ring, said slots extending from the ducts to the interior of the ring, and finally distorting the edges of each slot to narrow the entrance of the slot.

8. The method of forming rings for cages for presses, which consists in shaping it to fit respectively the ring-supporting means and the cake to be pressed, then forming a plurality of openings or ducts in the ring adjacent to the internal perimeter of said ring, next forming slots in the wall of the interior space of the ring, said slots extending from the ducts to the interior of the ring, then broaching each duct to diminish the length of each slot, and finally distorting the edges of each slot to narrow the entrance of the slot.

Signed at Atlanta, Georgia, this eighteenth day of May, 1920.

NELSON B. HENRY.